United States Patent
Takeshita et al.

(10) Patent No.: US 10,211,923 B2
(45) Date of Patent: Feb. 19, 2019

(54) OPTICAL NETWORK SYSTEM, OPTICAL NODE DEVICE, AND OPTICAL PATH SETTING METHOD

(71) Applicant: NEC Corporation, Tokyo (JP)

(72) Inventors: Hitoshi Takeshita, Tokyo (JP); Tomoyuki Hino, Tokyo (JP); Shinsuke Fujisawa, Tokyo (JP); Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/526,093

(22) PCT Filed: Nov. 11, 2015

(86) PCT No.: PCT/JP2015/005636
§ 371 (c)(1),
(2) Date: May 11, 2017

(87) PCT Pub. No.: WO2016/079959
PCT Pub. Date: May 26, 2016

(65) Prior Publication Data
US 2017/0338890 A1 Nov. 23, 2017

(30) Foreign Application Priority Data
Nov. 19, 2014 (JP) .................. 2014-234617

(51) Int. Cl.
*H04B 17/00* (2015.01)
*H04B 10/27* (2013.01)
(Continued)

(52) U.S. Cl.
CPC .......... *H04B 10/27* (2013.01); *H04B 10/0795* (2013.01); *H04J 14/0227* (2013.01); *H04L 12/44* (2013.01)

(58) Field of Classification Search
CPC .......... H04B 10/2575; H04B 10/25751; H04B 10/0773; H04B 10/27; H04B 10/0795;
(Continued)

(56) References Cited

U.S. PATENT DOCUMENTS

| 7,426,210 B1 * | 9/2008 | Miles ................. H04J 14/0223 370/400 |
| 2005/0122899 A1 * | 6/2005 | DeBoer ................... H04J 3/085 370/222 |

(Continued)

FOREIGN PATENT DOCUMENTS

| JP | 2011-023981 A | 2/2011 |
| JP | 2012-005088 A | 1/2012 |

(Continued)

OTHER PUBLICATIONS

International Search Report, Corresponding to PCT/JP2015/005636, dated Jan. 19, 2016, 2 pp.

(Continued)

*Primary Examiner* — Don N Vo
(74) *Attorney, Agent, or Firm* — Wilmer Cutler Pickering Hale and Dorr LLP (57) ABSTRACT

In an optical network system based on a wavelength division multiplexing system using a flexible frequency grid, with the diversification of optical modulation methods, the management burden on an optical network management device increases, and its control becomes complicated; therefore, an optical network system according to an exemplary aspect of the present invention includes an optical network management device configured to receive a traffic demand, design an optical path capable of accommodating the traffic demand, and create optical path design information of a design result; and an optical node device configured to be used for creating the optical path, wherein the optical node device calculates an allocable bandwidth from the optical (Continued)

path design information and optical node device information on a configuration of the optical node device, and the allocable bandwidth is an optical frequency bandwidth of a generable optical path that the optical node device is capable of generating, and the optical network management device sets, from among optical path candidates having the allocable bandwidth, a desired optical path that matches the optical path design information.

14 Claims, 9 Drawing Sheets

(51) Int. Cl.
*H04L 12/44* (2006.01)
*H04B 10/079* (2013.01)
*H04J 14/02* (2006.01)

(58) Field of Classification Search
CPC .. H04J 3/00; H04J 3/1694; H04J 3/085; H04J 14/0267; H04J 14/0227; H04L 45/62; H04L 12/44; H04Q 11/0067
USPC .......................................................... 398/25
See application file for complete search history.

(56) References Cited

U.S. PATENT DOCUMENTS

| | | | |
|---|---|---|---|
| 2013/0236169 A1* | 9/2013 | Gaudette | H04B 10/0793 398/25 |
| 2014/0044431 A1* | 2/2014 | Hussain | H04J 14/0227 398/79 |
| 2014/0282783 A1* | 9/2014 | Totten | H04L 12/2885 725/111 |

FOREIGN PATENT DOCUMENTS

| | | |
|---|---|---|
| JP | 2013-009264 A | 1/2013 |
| JP | 2013-179517 A | 9/2013 |

OTHER PUBLICATIONS

Shen, Zhi-shu et al., "A novel flexible grid/semi-flexible grid optical path network design algorithm that reserves exclusive frequency slots for high bitrate signals," 2014 International Conference on Optical Network Design and Modeling, Apr. 19, 2014, (ONDM, May 19-22, 2014), Stockholm, Sweden, pp. 287-292, 6 pp.

* cited by examiner

|  | NUMBER OF SLOTS | QUALITY | CAPACITY | CENTER OPTICAL FREQUENCY |
|---|---|---|---|---|
| OPTICAL PATH 1 | 1 | Q1 | b1 | $\lambda 1$ |
| OPTICAL PATH 2 | 2 | Q2 | b2 | $\lambda 2$ |
| OPTICAL PATH 3 | 4 | Q3 | b3 | $\lambda 3$ |

| | OPTICAL MODULATION METHOD 1 | OPTICAL MODULATION METHOD 2 | ...... | OPTICAL MODULATION METHOD N |
|---|---|---|---|---|
| DIGITAL FILTER METHOD 1 | $\eta 11$ | $\eta 12$ | | $\eta 1N$ |
| DIGITAL FILTER METHOD 2 | $\eta 21$ | $\eta 22$ | | |
| ...... | | | | |
| DIGITAL FILTER METHOD N | $\eta N1$ | | | $\eta NN$ |

OPTICAL NETWORK SYSTEM, OPTICAL NODE DEVICE, AND OPTICAL PATH SETTING METHOD

CROSS-REFERENCE TO RELATED APPLICATIONS

The present application is a national stage application of International Application No. PCT/JP2015/005636 entitled "Optical Network System, Optical Node Device, and Optical Path Setting Method," filed on Nov. 11, 2015, which claims the benefit of priority from Japanese Patent Application No. 2014-234617, filed on Nov. 19, 2014, the disclosures of which are incorporated herein in their entirety by reference thereto.

TECHNICAL FIELD

The present invention relates to optical network systems, optical node devices, and an optical path setting methods, in particular, to an optical network system, an optical node device, and an optical path setting method based on a wavelength division multiplexing system using a flexible frequency grid.

BACKGROUND ART

A current challenge for optical communications is to expand the capacities of optical backbone network to cope with the possible future explosive expansion of information communications traffic. Various approaches are being taken to the challenge. One of the approaches is to carry out research and development regarding an improvement in usage efficiency of an optical frequency band.

In optical network systems, optical frequency bands are used in accordance with the Dense Wavelength Division Multiplexing (DWDM) system standardized by the Telecommunication Standardization sector of the International Telecommunication Union (ITU-T). In the DWDM system, the entire available optical frequency band is divided into narrow segments by a grid with constant width, called a wavelength grid, and optical signals in one wavelength channel are allocated within a grid spacing (ITU-T recommendation G.694.1).

In a flexible frequency grid that is standardized by the ITU-T recommendation G.694.1, the minimum channel spacing is set at 12.5 GHz instead of 50 GHz used conventionally, and an optical frequency slot width is variable by 12.5 GHz. This makes it possible to allocate a frequency slot of different widths to each optical path; accordingly, it becomes possible to minimize an optical bandwidth to be allocated to an optical path. In other words, it is possible to reduce unnecessary band allocation by allocating only a needed optical frequency band, which makes it possible to improve the usage efficiency of the optical frequency band.

Specifically, an optical network management device constituting an optical network system calculates the minimum number of optical frequency slots to be allocated to an optical path, and a center optical frequency of an optical path, depending on a traffic demand. In this case, a lot of optical frequency slots are required because the S/N ratio (signal to noise ratio) of an optical signal deteriorates as the optical path length becomes longer even though optical signals have the same signal speed.

A variable band optical transmitter and receiver device constituting an optical network system changes an optical frequency bandwidth of an optical signal to be inputted and output based on the calculation results by the optical network management device. In this example, it is possible to change the optical frequency bandwidth by changing an optical modulation method (see Patent Literature 1, for example).

Specifically, if signal speeds are the same, the optical frequency bandwidth of an output optical signal becomes larger for an optical modulation method in which the number of modulation symbols is smaller. This is because the optical frequency usage efficiency becomes higher as the number of levels of multilevel modulation becomes larger. For instance, the optical frequency bandwidth of the optical signal generated by a QPSK (Quadrature Phase Shift Keying) optical modulation method is larger than the optical frequency bandwidth of the optical signal generated by a 16QAM (Quadrature Amplitude Modulation) optical modulation method. The optical frequency bandwidth of the optical signal generated by a BPSK (Binary Phase Shift Keying) optical modulation method is larger than the optical frequency bandwidth of the optical signal generated by the QPSK optical modulation method. That is to say, the optical frequency bandwidth of the optical signal to be generated becomes larger in order of 16QAM<QPSK<BPSK.

On the other hand, a transmission distance, that is, the length of an optical path that can be set becomes longer for an optical modulation method in which the number of modulation symbols is smaller. The reason is that the distance between symbols becomes longer as the number of modulation symbols becomes smaller; consequently, the optical S/N ratio after having been transmitted over a predetermined distance becomes larger.

Accordingly, it is possible to allocate an optical frequency slot to an optical path based on the result calculated by the optical network management device by selecting an optical modulation method in an optical transmitter and receiver device depending on a transmission distance of an optical signal, that is, an optical path length.

CITATION LIST

Patent Literature

[PTL 1] Japanese Patent Application Laid-open Publication No. 2013-009264 (paragraphs [0002] to [0008])

SUMMARY OF INVENTION

Technical Problem

As mentioned above, it is possible to change the optical frequency bandwidth of an optical signal by changing an optical modulation method. In this case, if an optical network system has optical transmitter and receiver devices different in optical modulation methods that the devices can deal with, or if the optical transmitter and receiver devices have an increased number of types of optical modulation methods that they can deal with, the management and control of the optical transmitter and receiver devices are complicated, and the load of an optical network management device increases.

Specifically, for instance, if a signal speed is equal to 100 Gbps (Giga bit per second), and a DP-QPSK (Dual Polarization-QPSK) method is selected as an optical modulation method, the number of required optical frequency slots is equal to four. On the other hand, in a DP-Nyquist-QPSK method in which optical spectral shaping by digital filter techniques is applied to the DP-QPSK method jointly, the number of required optical frequency slots is equal to three. That is to say, even though base optical modulation method is the same DP-QPSK method, the number of required optical frequency slots varies by using another technique together. In this way, there is the potential that many more optical modulation methods of its kind derive from now on by applying various techniques to the base optical modulation method jointly depending on the intended use.

The above-mentioned related optical network management device designs an optical path according to a traffic demand for an optical network system, minimizes the number of required optical frequency band slots, and consequently maximizes the optical frequency usage efficiency. The related optical network management device stores in advance optical modulation methods that the optical transmitter and receiver device can deal with and the number of required optical frequency band slots when employing the optical modulation method. The related optical network management device determines an optical modulation method by which to achieve the number of required optical frequency band slots calculated, and controls the optical transmitter and receiver device so as to use the optical modulation method determined.

If the number of required optical frequency band slots varies by changing the characteristics of a digital filter that is used together, for example, it is necessary for the related optical network management device to manage the optical modulation method as a new modulation method even though a base optical modulation method is the same. In this case, the management burdens of the related optical network management device increases because it is possible to set variously the characteristics of a digital filter that is used in conjunction with the base optical modulation method.

If an optical network system has several types of optical transmitter and receiver devices that differ in specifications, the optical network management device needs to manage, in which node, how many, and with what specifications, variable band optical transmitter and receiver devices are installed. This makes the management burden on the optical network management device increase and its control complicated.

As described above, in an optical network system based on a wavelength division multiplexing system using a flexible frequency grid, there has been the problem that, with the diversification of optical modulation methods, the management burden on an optical network management device increases, and its control becomes complicated.

The object of the present invention is to provide an optical network system, an optical node device, and an optical path setting method that solve the above-mentioned problem.

Solution to Problem

An optical network system according to an exemplary aspect of the present invention includes an optical network management device configured to receive a traffic demand, design an optical path capable of accommodating the traffic demand, and create optical path design information of a design result; and an optical node device configured to be used for creating the optical path, wherein the optical node device calculates an allocable bandwidth from the optical path design information and optical node device information on a configuration of the optical node device, and the allocable bandwidth is an optical frequency bandwidth of a generable optical path that the optical node device is capable of generating, and the optical network management device sets, from among optical path candidates having the allocable bandwidth, a desired optical path that matches the optical path design information.

An optical node device according to an exemplary aspect of the present invention includes an interface means for receiving, from an optical network management device, optical path design information of a design result of an optical path capable of accommodating a desired traffic demand: an optical transmitter and receiver configured to transmit and receive an optical signal; a device information storage means for storing optical node device information on a configuration of the optical transmitter and receiver; and a control means for calculating, from the optical path design information and the optical node device information, an allocable bandwidth that is an optical frequency bandwidth of a generable optical path that the optical transmitter and receiver is capable of generating, and determines whether or not an optical path candidate having the allocable bandwidth matches the optical path design information.

An optical path setting method according to an exemplary aspect of the present invention includes designing an optical path capable of accommodating a desired traffic demand, and creating optical path design information of a design result; obtaining an allocable bandwidth calculated from the optical path design information and optical node device information on a configuration of an optical node device used for generating an optical path, the allocable bandwidth being an optical frequency bandwidth of a generable optical path, the optical node device being capable of generating the generable optical path; and selecting and setting a desired optical path matching the optical path design information, from among optical path candidates having the allocable bandwidth.

Advantageous Effects of Invention

According to an optical network system, an optical node device, and an optical path setting method of the present invention, it is possible to reduce the management burden of an optical network management device and simplify its control even where optical modulation methods become diversified, in an optical network system based on a wavelength division multiplexing system using a flexible frequency grid.

EXAMPLE EMBODIMENT

Example embodiments of the present invention will be described below with reference to the drawings.

A First Example Embodiment

Figure 1:
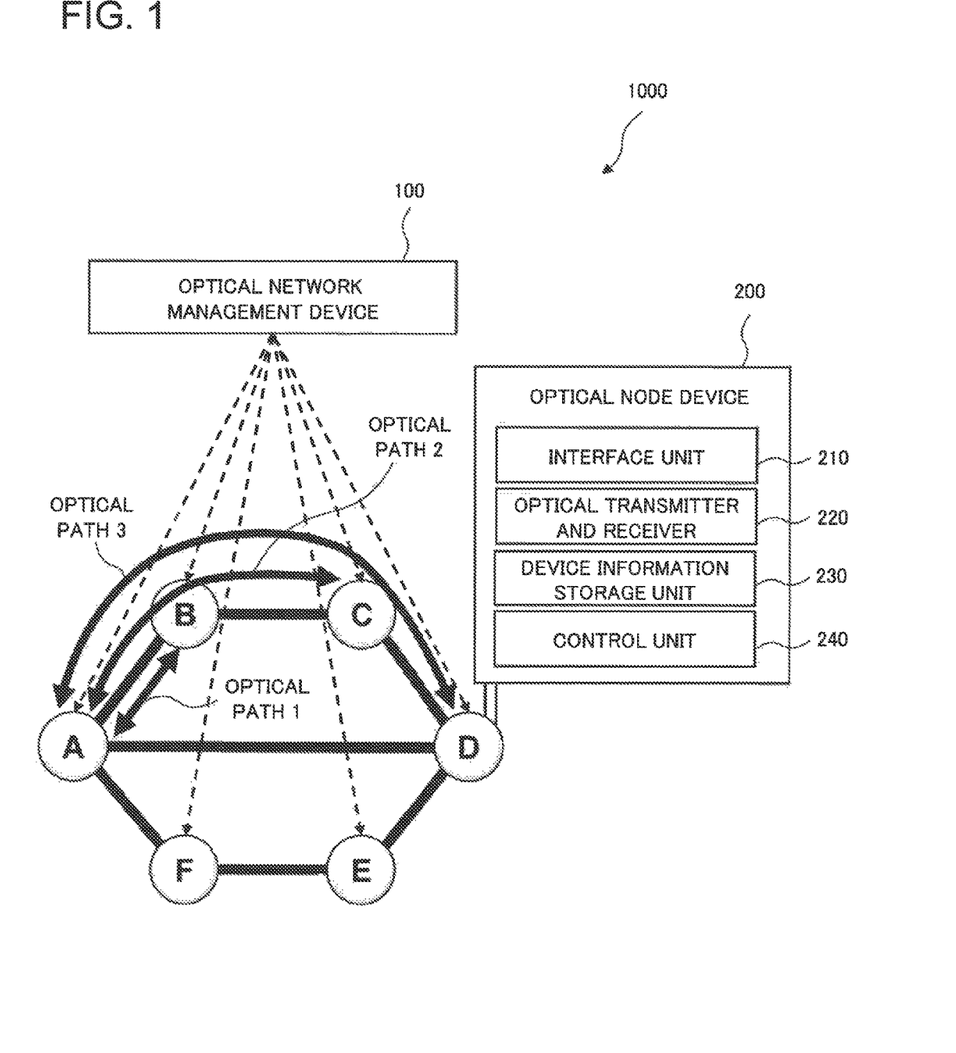
FIG. 1 is a block diagram illustrating a configuration of an optical network system according to a first example embodiment of the present invention.

FIG. 1 is a block diagram illustrating a configuration of an optical network system 1000 according to a first example embodiment of the present invention.

The optical network system 1000 includes an optical network management device 100 and an optical node device 200 used for creating an optical path. Here, the optical network system 1000 is an optical network system based on a wavelength division multiplexing system using a flexible frequency grid.

The optical network management device 100 receives a traffic demand, designs an optical path capable of accommodating the traffic demand, and creates optical path design information of a design result. The optical node device 200 calculates an allocable bandwidth from the optical path design information and optical node device information on a configuration of the optical node device 200, and the allocable bandwidth is an optical frequency bandwidth of a generable optical path that the optical node device 200 is capable of generating. The optical network management device 100 sets, from among optical path candidates having the allocable bandwidth, a desired optical path that matches the optical path design information.

The optical node device 200 can be configured to include an interface unit 210, an optical transmitter and receiver 220, a device information storage unit 230, and a control unit 240.

The interface unit 210 receives, from the optical network management device 100, optical path design information of a design result of an optical path that is capable of accommodating a desired traffic demand. The optical transmitter and receiver 220 transmits and receives an optical signal. The device information storage unit 230 stores optical node device information on a configuration of the optical transmitter and receiver 220. The control unit 240 calculates, from the optical path design information and the optical node device information, an allocable bandwidth that is an optical frequency bandwidth of a generable optical path that the optical node device 200 is capable of generating, and determines whether or not an optical path candidate having the allocable bandwidth matches the optical path design information.

Next, the operation of the optical network system 1000 according to the present example embodiment will be described in detail. The operation is described using an optical network including six nodes as illustrated in FIG. 1 as an example. The optical node device 200 is disposed at each node, and the optical network management device 100 manages the entire optical network.

A case is described where a traffic demand (a demand) arises, and demands for connecting a node A and a node B (demand 1), connecting the node A and a node C (demand 2), and connecting the node A and a node D (demand 3) are generated. Here, it is assumed that all the capacities of generated demands are equal.

The optical network management device 100 allocates a communication route, an optical frequency band slot, and a center optical frequency with respect to a generated traffic demand. The optical network management device 100 designs an optical path so that the resource consumption of the optical network may be minimized by making a communication path the shortest distance. As a result, the demands 1 to 3 are respectively accommodated in optical paths 1 to 3. In this example, the optical path length increases in order of optical path 1<optical path 2<optical path 3. Accordingly, the number of optical frequency band slots to be allocated to the optical paths 1 to 3 increases in order of optical path 1<optical path 2<optical path 3. The product of the number of optical frequency band slots and an optical frequency slot width becomes equal to the optical frequency bandwidth. The minimum optical frequency slot width is equal to 12.5 GHz in cases where the flexible frequency grid is used.

Figure 2A:
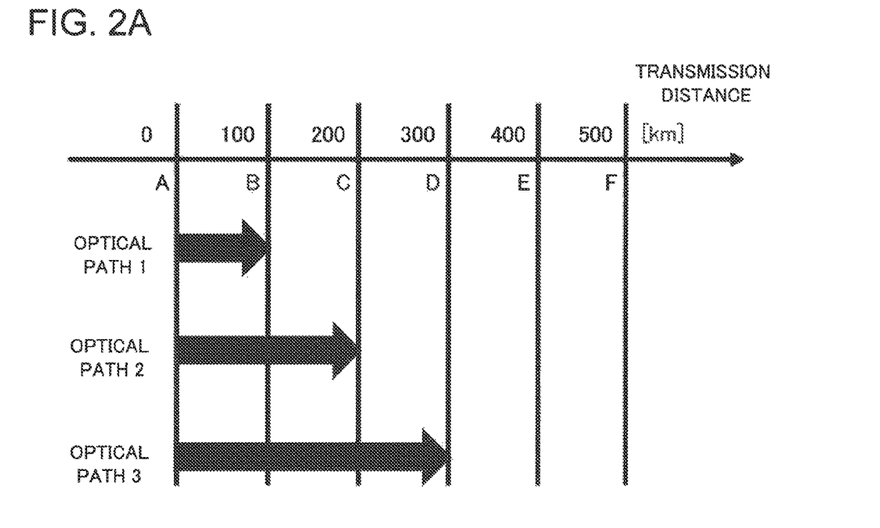
FIG. 2A is a diagram illustrating optical path design information calculated by an optical network management device constituting the optical network system according to the first example embodiment of the present invention.
Figure 2B:
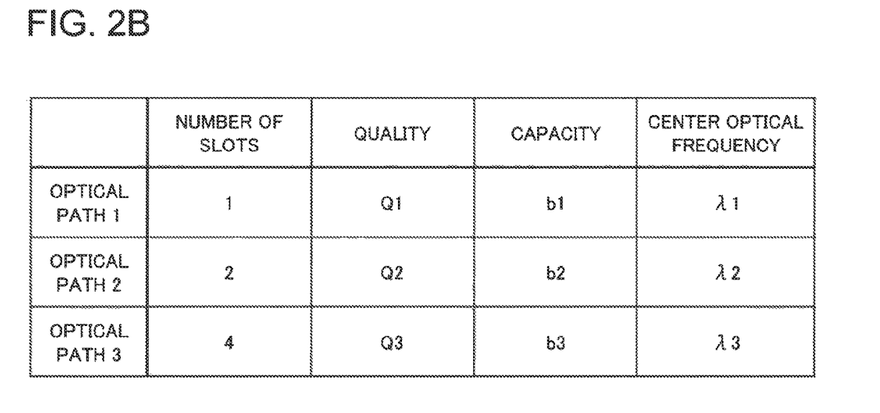
FIG. 2B is a table diagram illustrating optical path design information calculated by the optical network management device constituting the optical network system according to the first example embodiment of the present invention.

FIG. 2A and FIG. 2B illustrate an example of optical path design information calculated by the optical network management device 100. As illustrated in FIG. 2B, the optical path design information includes signal capacities and qualities.

The optical path 1 to accommodate the demand 1 is connected between the node A and the node B, and measures 100 km in length, with the number of allocated optical frequency slots equal to one and the center optical frequency equal to $\lambda 1$. Here, it is assumed that a Q value represents a lowest received signal quality necessary to transmit an optical signal over a desired distance, and that the lowest received signal quality necessary to transmit an optical signal over 100 km is represented by Q1. The optical path 2 to accommodate the demand 2 is connected between the node A and the node C, and measures 200 km in length, with the lowest received signal quality equal to Q2, the number of allocated optical frequency slots equal to two, and the center optical frequency equal to $\lambda 2$. Because the length of the optical path 2 is longer than the length of the optical path 1, twice the number of optical frequency slots is allocated to the optical path 2. The optical path 3 to accommodate the demand 3 is connected between the node A and the node D, and measures 300 km in length, with the lowest received signal quality equal to Q3, the number of allocated optical frequency slots equal to four, and the center optical frequency equal to $\lambda 3$. Because the length of the optical path 3 is further longer than the length of the optical path 2, quadruple the number of optical frequency slots is allocated to the optical path 3.

Here, it is assumed that the optical network management device 100 knows in advance that it is necessary to set the number of optical frequency slots at two or more if the optical path length is larger than 100 km, that is, the lowest received signal quality is lower than Q1. In the same way, it is assumed that the optical network management device 100 knows in advance that it is necessary to set the number of optical frequency slots at four or more if the optical path length is larger than 200 km, that is, the lowest received signal quality is lower than Q2.

In this example, it is assumed that the number of required optical frequency slots increases with each extension of the transmission distance by 100 km: however, a unit of extension is not limited to 100 km. It is not necessary for the increment of the transmission distance to be an equal interval, and the increment of the transmission distance may be an unequal space as cases such as two slots for 100 km or longer, three slots for 120 km or longer, and four slots for 230 km or longer.

The optical node devices 200 are disposed at the node A to a node F illustrated in FIG. 1 respectively and used for generating the optical path 1 to the optical path 3. The device information storage unit 230 included in to the optical node device 200 stores in advance, as the optical node device information, an optical modulation method by which the optical transmitter and receiver 220 is capable of inputting and outputting an optical signal, and the number of required optical frequency slots.

Figure 3:
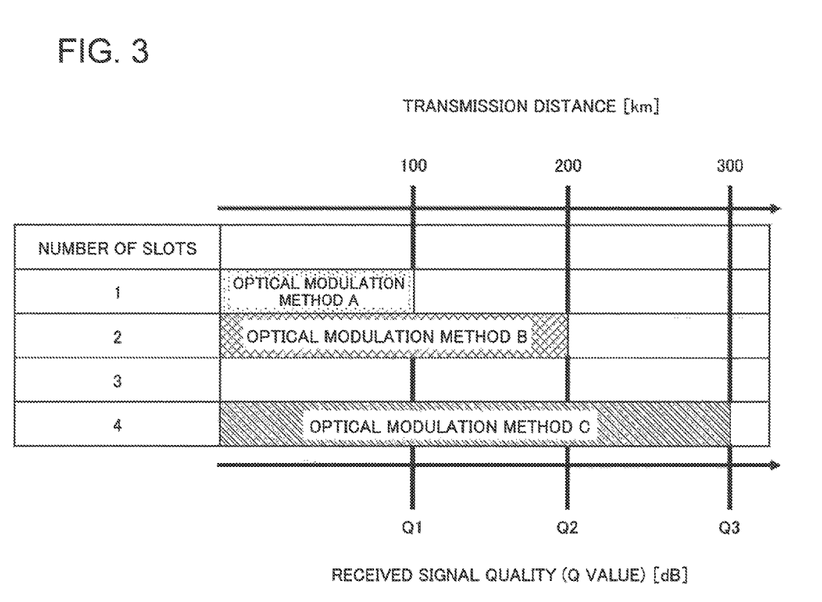
FIG. 3 is a diagram illustrating optical node device information stored in a device information storage unit included in an optical node device according to the first example embodiment of the present invention.

FIG. 3 illustrates an example of the optical node device information stored in the device information storage unit 230 included in the optical node device 200. FIG. 3 illustrates optical modulation methods, the numbers of required optical frequency slots, and transmittable distances in association with each other, which are stored in the device information storage unit 230. For instance, regarding the optical modulation method A, the number of required optical frequency slots is one, the transmittable distance is 100 km, and the lowest received signal quality in this case is Q1.

The optical node device 200 receives, from the optical network management device 100, a demand including the number of optical frequency slots to which optical signals are allocated and a transmittable distance, as the optical path design information. The optical node device 200 then generates an optical signal using an optical modulation method that matches the demand, and outputs the optical signal to an optical path. An optical signal to be output to the optical path 1 will be described below as an example.

The design results of the optical path 1 by the optical network management device 100 include the condition that the number of optical frequency slots is one, the optical path length, that is, the transmission distance is 100 km, and the lowest received signal quality in this case is Q1, and the center optical frequency is λ1, as illustrated in FIG. 2A and FIG. 2B. The optical node device 200 judges that the allocable bandwidth corresponds to a width of one optical frequency slot, and an appropriate optical modulation method is the optical modulation method A, from the optical path design information and the optical node device information stored in the device information storage unit 230 (see FIG. 3). The optical node device 200 adjusts a light source in the optical transmitter and receiver 220 to the center optical frequency λ1, generates an optical signal by the optical modulation method A, and outputs the optical signal to the optical path 1. Much the same is true on the optical paths 2 and 3.

By the above-mentioned sequence of operations, the optical signal obtained by reflecting the results of an optical path design by the optical network management device 100 is output from the optical node device 200. In this case, it is unnecessary for the optical network management device 100 to obtain the information indicating by which optical modulation method, the optical transmitter and receiver 220 included in the optical node device 200 can operate. It is only necessary for the optical network management device 100 to instruct the optical node device 200 on the number of optical frequency slots to be allocated, an optical path length of the information equivalent to a lowest received signal quality, and a center optical frequency. This makes it unnecessary to change the optical path design information of which the optical node device 200 is notified, even where a new optical modulation method is introduced into the optical transmitter and receiver 220 in operation, or even where there are optical node devices 200 including optical transmitters and receivers 220 that differ in specifications of optical modulation methods from each other, for example.

Next, an optical path setting method according to the present example embodiment will be described.

In the optical path setting method according to the present example embodiment, first, an optical path capable of accommodating a desired traffic demand is designed, and optical path design information of a design result is created. An allocable bandwidth is obtained that is calculated from the optical path design information and optical node device information on a configuration of an optical node device used for generating an optical path, and the allocable bandwidth is an optical frequency bandwidth of a generable optical path that the optical node device is capable of generating. In addition, a desired optical path is selected and set that matches the optical path design information, from among optical path candidates having the allocable bandwidth.

As mentioned above, in the optical network system, the optical node device, and the optical path setting method according to the present example embodiment, the optical node device is configured to calculate an allocable bandwidth that is an optical frequency bandwidth of a generable optical path that can be generated. Therefore, according to the optical network system, the optical node device, and the optical path setting method of the present example embodiment, it is possible to reduce the management burden of an optical network management device and simplify its control even where optical modulation methods become diversified.

A Second Example Embodiment

Next, a second example embodiment of the present invention will be described. The configuration of an optical network system according to the present example embodiment is the same as the configuration of the optical network system according to the first example embodiment. Specifically, an optical network system 1000 includes an optical network management device 100 and an optical node device 200 used for creating an optical path. The optical node device 200 can be configured to include an interface unit 210, an optical transmitter and receiver 220, a device information storage unit 230, and a control unit 240.

In the optical network system according to the present example embodiment, optical node device information stored in the device information storage unit 230 included in the optical node device 200 differs from that in the first example embodiment.

In the present example embodiment, the optical node device information includes the number k of optical transmitters and receivers included in the optical node device 200, the number m of optical carrier waves (optical carriers) that the optical transmitter and receiver is capable of transmitting and receiving, and an optical modulation method that the optical transmitter and receiver uses. The device information storage unit 230 is configured to store the optical modulation method and an optical frequency usage efficiency η of the optical signal to be generated by the optical transmitter and receiver, making a correlation between them.

Figure 4:
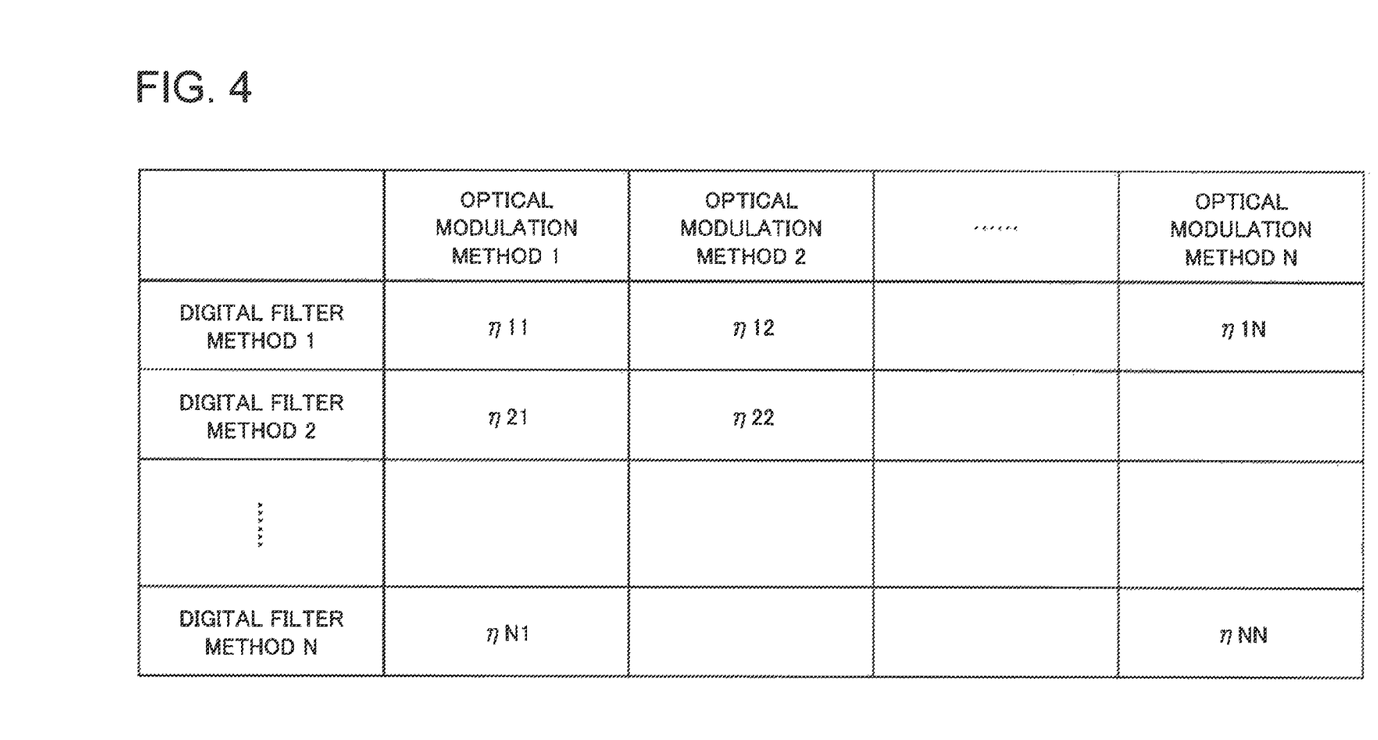
FIG. 4 is a diagram illustrating optical node device information stored in a device information storage unit included in an optical node device according to a second example embodiment of the present invention.

FIG. 4 illustrates an example of the optical node device information stored in the device information storage unit 230 included in the optical node device 200. As illustrated in FIG. 4, the device information storage unit 230 stores optical frequency usage efficiencies $\eta_{11}$ to $\eta_{NN}$ relating them to base optical modulation methods 1 to N and digital filter methods 1 to N that are used in combination.

The optical node device 200 selects the optical frequency usage efficiency η based on the optical path design information obtained from the optical network management device 100. The optical path design information includes a signal capacity (a bit rate) and information on signal quality such as a transmission distance, an optical signal-to-noise ratio (OSNR), and a Q value. If it is possible to select a plurality of candidates for the optical frequency usage efficiency η with respect to one type of optical path design information, a maximum value of the optical frequency usage efficiencies η can be selected, for instance.

The optical node device 200 calculates, from the optical path design information and the optical node device information, an allocable bandwidth that is an optical frequency bandwidth of a generable optical path that the optical node device 200 is capable of generating. Here, the optical node device 200 is configured to calculate the number N of optical frequency slots that corresponds to an allocable bandwidth according to the following formula (1).

$$N = (1/\Delta f) \times \sum_{j}^{k} \left( \sum_{i}^{m_j} (b/\eta)_i \right)_j \quad (1)$$

In the formula (1), N represents the number of optical frequency slots, η represents a frequency usage efficiency [bps/Hz] of an optical signal that the optical transmitter and receiver 220 generates, b represents a capacity [bps], $m_j$ represents the number of optical carrier waves (carriers) that the optical transmitter and receiver 220 can transmit and receive, and k represents the number of the optical transmitters and receivers 220, respectively. In addition, $\Delta f$ represents a width of an optical frequency slot and is equal to 12.5 GHz in the flexible frequency grid.

Specifically, the control unit 240 included in the optical node device 200 calculates a bandwidth per optical transmitter and receiver that is the sum of a unit bandwidth from one to the number (m) of optical carrier waves, where the unit bandwidth is a quotient (b/η) that is obtained by dividing the signal capacity b by the optical frequency usage efficiency η and is calculated for each of the optical carrier waves. The allocable bandwidth is calculated by getting the sum of the bandwidth per optical transmitter and receiver from one to the number (k) of optical transmitters and receivers.

Figure 5:
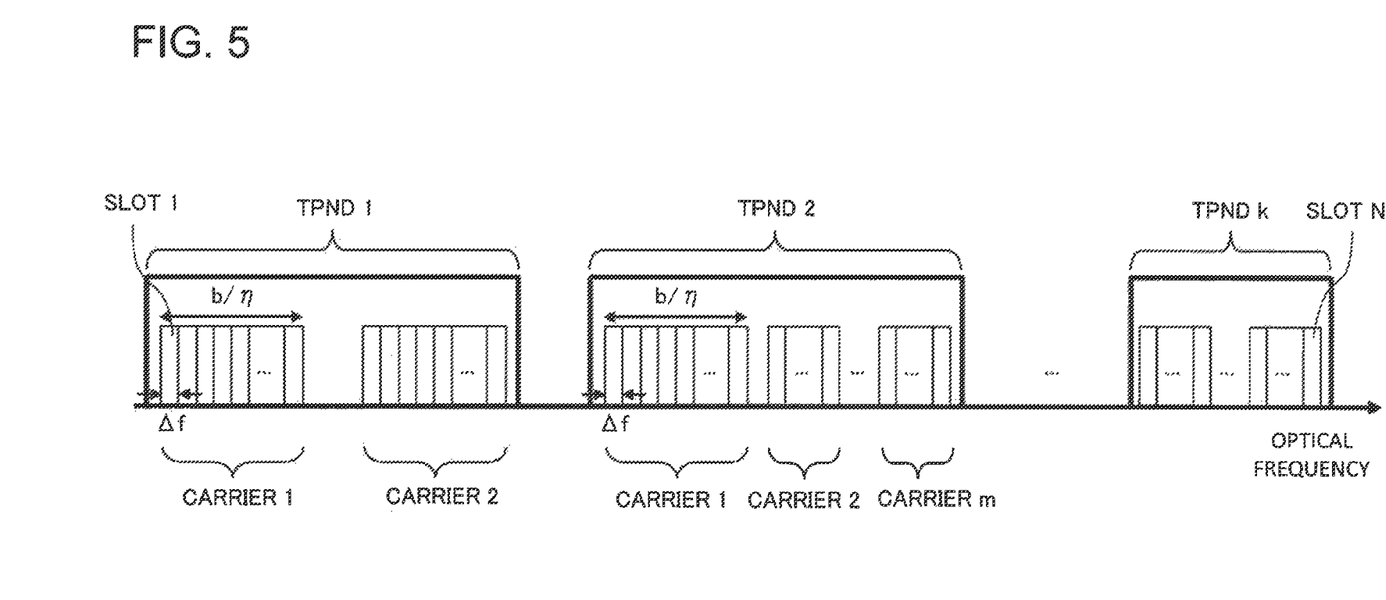
FIG. 5 is a diagram to describe the operation of the optical node device according to the second example embodiment of the present invention.

FIG. 5 schematically illustrates an allocable bandwidth in this case. In FIG. 5, the horizontal axis represents an optical frequency. The optical node device 200 includes k optical transmitters and receivers (TPNDs). Each optical transmitter and receiver (TPND) transmits and receives m optical carrier waves (carriers). In this case, the allocable bandwidth is an optical frequency bandwidth that corresponds to N optical frequency slots from slot 1 to slot N.

The operation of the optical node device 200 will be described below that the optical node device 200 determines an optical modulation method based on the number of optical frequency slots and a lowest received signal quality serving as the optical path design information that is obtained from the optical network management device 100.

Figure 6:
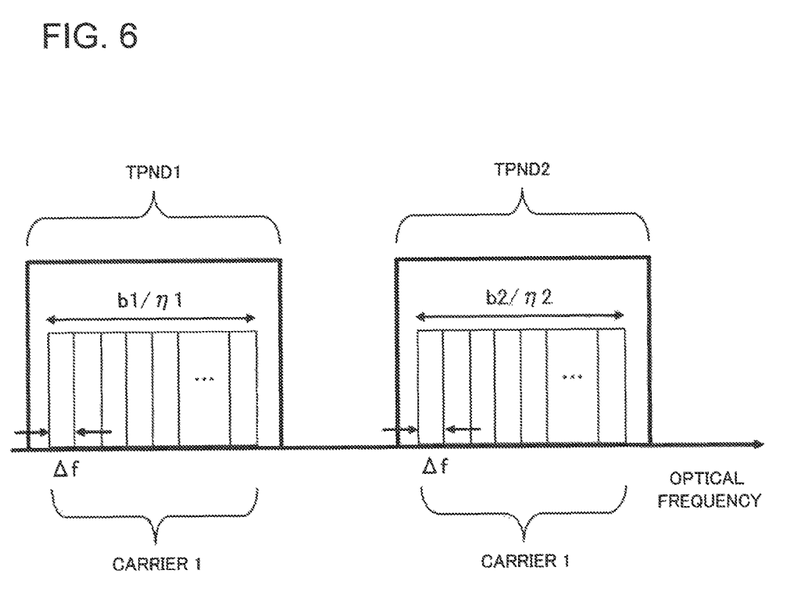
FIG. 6 is a diagram to describe the operation of the optical node device according to the second example embodiment of the present invention.

Here, as illustrated in FIG. 6, the operation will be described using a case as an example where the optical node device 200 includes two optical transmitters and receivers (TPNDs) (k=2), and each optical transmitter and receiver (TPND) transmits and receives one optical carrier wave (a carrier) (m=1). Specifically, two optical transmitters and receivers are used to create an optical path 1 (capacity B, lowest received signal quality Q) that results from the design by the optical network management device 100 designed, and a single optical carrier wave (carrier) is used for the optical signal that is output from each optical transmitter and receiver. As a result, one optical path is created by two optical carrier waves (carriers).

The number of optical frequency slots required for the optical path in this case is calculated as the following formula (2) by substituting frequency usage efficiencies η1 and η2, and capacities b1 and b2 of two carriers into the formula (1).

$$N = (1/\Delta f) \times (b1/\eta 1 + b2/\eta 2) \quad (2)$$

The formula (2) expresses n1=(1/$\Delta f$)×b1/η1, and n2=(1/$\Delta f$)×b2/η2, where n1 and n2 respectively represent the numbers of optical frequency slots that the two optical transmitters and receivers TPND1 and TPND2 generate.

Figure 7:
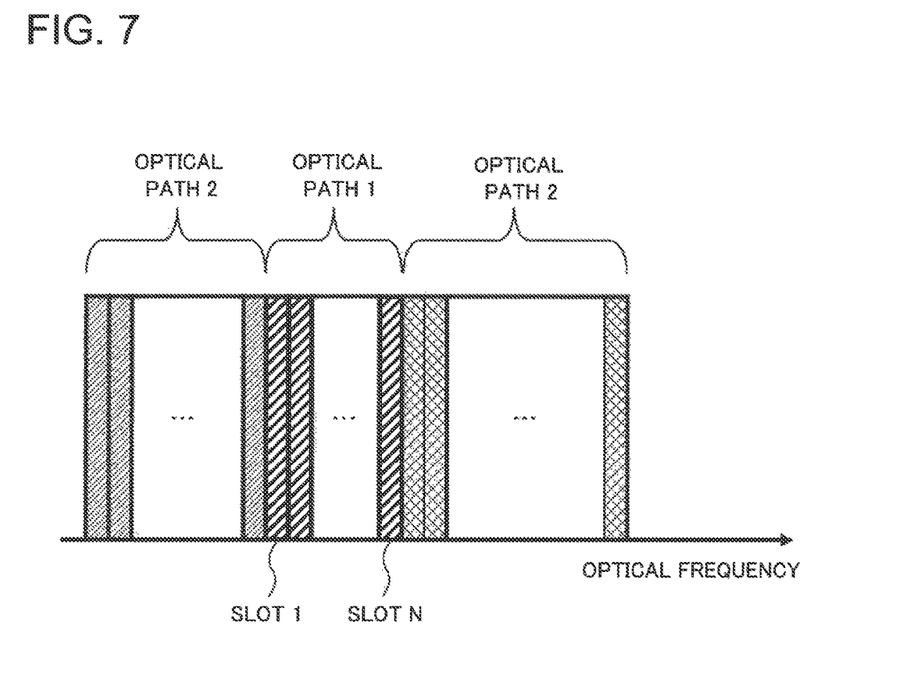
FIG. 7 is a diagram illustrating the results of the optical path design by an optical network management device constituting an optical network system according to the second example embodiment of the present invention.

FIG. 7 is a diagram illustrating the results of the optical path design that the optical network management device has performed on entire optical network, and illustrates optical frequency slots that are allowed to be allocated to the optical path 1 of the design result.

FIG. 7 is a diagram illustrating the results of the optical path design by an optical network management device constituting an optical network system according to the second example embodiment of the present invention. In the example illustrated in FIG. 7, N optical frequency slots can be used to generate the optical path 1.

The optical network management device instructs the optical node device to divide the optical path 1 having the capacity B into a sub optical path 1 having a capacity b1 and a sub optical path 2 having a capacity b2, and to generate the sub optical paths 1 and 2 by the optical transmitter and receiver (TPND) 1 and the optical transmitter and receiver (TPND) 2, respectively. In this case, the equality of capacity B=capacity b1+capacity b2 holds.

The control unit included in the optical node device determines optical frequency usage efficiencies η1 and η2 so that the inequality of N≥(1/$\Delta f$)×(b1/η1+b2/η2) may hold where N represents the number of optical frequency slots. The optical transmitter and receiver 1 and the optical transmitter and receiver 2 respectively generate optical signals with capacities equal to b1 and b2, and optical frequency usage efficiencies equal to η1 and η2, under the condition that the lowest received signal quality Q is satisfied. In this case, the control unit included in the optical node device determines whether or not the optical node device can handle an optical modulation method by which the optical signal can be generated that meets the optical path design result by the optical network management device.

If the control unit determines that the desired optical signal can be generated, the control unit notifies the optical network management device that the optical signal is successfully generated, and controls the optical transmitter and receiver so as to generate the sub optical path 1 and the sub optical path 2. The optical network management device receives notification that the optical transmitter and receiver 1 and the optical transmitter and receiver 2 can generate the desired optical signal; as a result, it gets to know that the sub optical path 1 and the sub optical path 2 are generated. The optical network management device bundles the sub optical path 1 and the sub optical path 2, and consequently completes the operation of generating the optical path having the capacity B that meets the condition of the lowest received signal quality Q.

If the control unit included in the optical node device determines that it is impossible to generate the desired optical signal, the control unit notifies the optical network management device that the generation has failed. This corresponds to a situation where it is impossible to generate the optical signals having the capacity b1 and the capacity b2 under the condition of the lowest received signal quality Q according to the optical modulation method that the optical transmitter and receiver 1 and the optical transmitter and receiver 2 can deal with.

By receiving notification that it is impossible to generate the desired optical signal, the optical network management device determines that it is insufficient to generate the optical path 1 that an optical path is divided into the sub optical path 1 and the sub optical path 2 only. Consequently, the optical network management device tries dividing an optical path into three: a sub optical path 1, a sub optical path 2, and a sub optical path 3, and generating the optical path 1 by using three optical transmitters and receivers included in the optical node device. This corresponds to a case with k=3 and m=1 in formula (1), and the operation in this case is similar to that in the case with k=2 and m=1.

The optical network management device and the optical node device repeat the above-mentioned operation until they succeed in generating the optical path 1. If it is impossible to generate the optical path 1 even though all available optical transmitters and receivers are used, the optical network management device determines that it is impossible to generate the optical path 1 under the condition of the capacity B and the lowest received signal quality Q.

Figure 8:
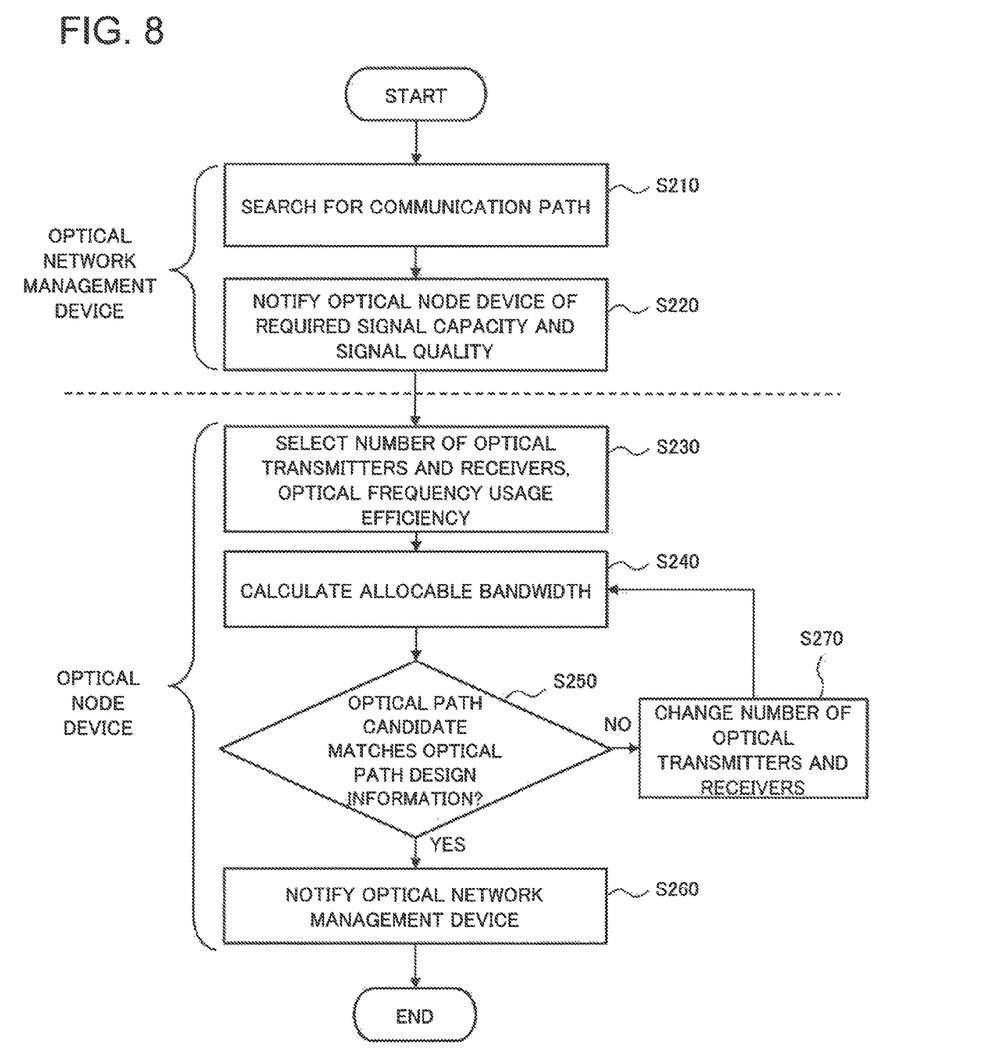
FIG. 8 is a flowchart to describe an optical path setting method in the optical network system according to the second example embodiment of the present invention.

Next, an optical path setting method in the optical network system according to the present example embodiment will be described in further detail. FIG. 8 is a flowchart to describe the optical path setting method in the optical network system of the present example embodiment.

The optical network management device receives a traffic demand and searches for a communication path corresponding to the traffic demand (Step S210). Then, the optical network management device designs an optical path capable of accommodating the traffic demand, and creates optical path design information of design results. Here, optical path design information includes a required signal capacity B (a bit rate), and information on signal quality such as a transmission distance (an optical path length), an optical S/N ratio (OSNR), and a Q value. The optical network management device notifies the optical node device of the optical path design information described above (Step S220).

The optical node device stores optical node device information on a configuration of the optical node device. Specifically, the optical node device stores an optical modulation method to be used by an optical transmitter and receiver included in the optical node device, and an optical frequency usage efficiency of the optical signal to be generated by the optical transmitter and receiver, making a correlation between them.

The optical node device selects first optical node device information that defines a first use configuration of the optical node device from among the optical node device information. Specifically, for instance, the optical node device selects the number of optical transmitters and receivers to be used, and optical frequency usage efficiencies of the optical signals to be generated by the optical transmitters and receivers (Step S230). Then, the optical node device calculates a first allocable bandwidth of the allocable bandwidth from the first optical node device information in this case and the optical path design information (Step S240). The optical node device determines whether or not a first optical path candidate having the first allocable bandwidth matches the optical path design information (Step S250).

If the first optical path candidate matches the optical path design information (Step S250/YES), the optical node device notifies the optical network management device of the first allocable bandwidth (Step S260), and the optical network management device sets the first optical path candidate as a desired optical path.

If the first optical path candidate does not match the optical path design information (Step S250/NO), the optical node device changes the above-mentioned first use configuration into a second use configuration. Specifically, for instance, the optical node device changes the number of optical transmitters and receivers to be used (Step S270). Then, an allocable bandwidth (a second allocable bandwidth) is calculated again from the optical path design information and second optical node device information by which the second use configuration in this case is defined (Step S240).

If the second optical path candidate calculated in this step matches the optical path design information (Step S250/YES), the optical node device notifies the optical network management device of the second allocable bandwidth (Step S260). Then, the optical network management device sets the second optical path candidate having the second allocable bandwidth as a desired optical path; as a result, the processes are completed. If it is impossible to select an optical path candidate that matches the optical path design information even where the above-mentioned processes are repeated, the optical node device notifies the optical network management device that it is impossible to generate a desired optical path, and the processes are completed.

In the above-mentioned description, the optical node device determines whether or not an optical path candidate matches the optical path design information in order to reduce the load of the optical network management device. The example embodiment, however, is not limited to this, and the optical network management device may determine it.

In this case, the optical node device notifies the optical network management device of a calculated first allocable bandwidth. The optical network management device determines whether or not a first optical path candidate having the first allocable bandwidth matches the optical path design information.

If the first optical path candidate matches the optical path design information, the optical network management device sets the first optical path candidate as a desired optical path.

On the other hand, if the first optical path candidate does not match the optical path design information, the optical network management device instructs the optical node device to change the first use configuration. In this case, the optical node device changes the first use configuration into a second use configuration. And then the optical node device calculates a second allocable bandwidth of the allocable bandwidth from the optical path design information and second optical node device information that defines the second use configuration, and notifies the optical network management device of the second allocable bandwidth. The optical network management device sets a second optical path candidate having the second allocable bandwidth as a desired optical path.

In the above-mentioned sequence of operations, it is unnecessary for the optical network management device to obtain the information indicating by which optical modulation method, the optical transmitter and receiver included in the optical node device can operate. This makes it unnecessary to change the optical path design information of which the optical node device is notified, even where an optical network has optical node devices that differ in specifications, or even where there is any change in the optical modulation method that the optical node device can deal with, for example. As a result, according to the optical network system, the optical node device, and the optical path setting method of the present example embodiment, it is possible to reduce the management burden of an optical network management device and simplify its control even where optical modulation methods become diversified.

A Third Example Embodiment

Next, a third example embodiment of the present invention will be described. The configuration of an optical network system according to the present example embodiment is the same as the configuration of the optical network system 1000 according to the first example embodiment. Specifically, the optical network system includes an optical network management device and an optical node device used for creating an optical path. The optical node device can be configured to include an interface unit, an optical transmitter and receiver, a device information storage unit, and a control unit.

The optical node device of the present example embodiment is configured to include one optical transmitter and receiver (TPND) (k=1), which can transmit and receive two optical carrier waves (optical carries) (m=2). Specifically, the optical node device of the present example embodiment can generate two optical carrier waves (optical carriers) by one optical transmitter and receiver (TPND).

Figure 9:
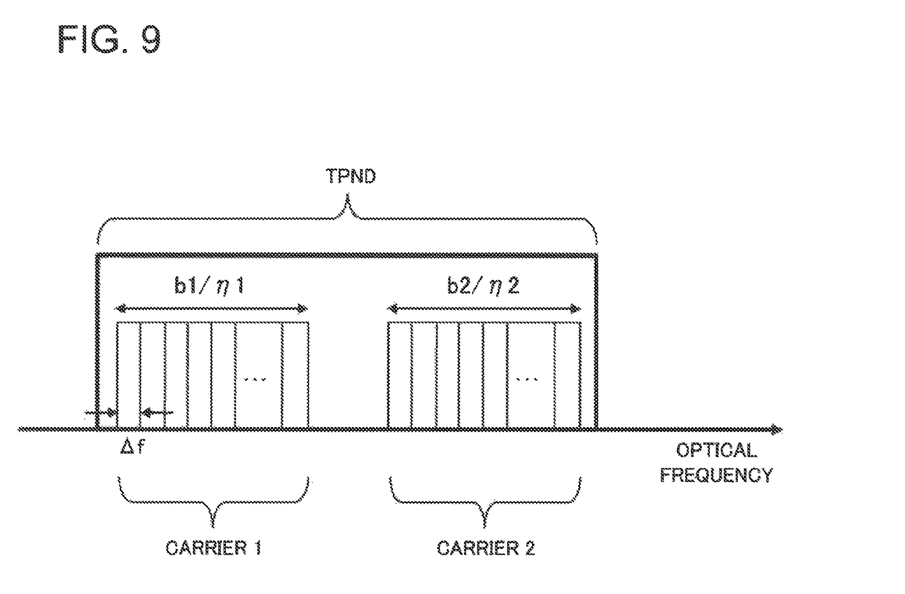
FIG. 9 is a diagram to describe an optical path setting method in an optical network system according to a third example embodiment of the present invention.

With reference to FIG. 9, an optical path setting method in the optical network system of the present example embodiment will be described below.

The optical node device is capable of generating two carriers, that is, a carrier 1 and a carrier 2 independently using one optical transmitter and receiver (TPND). Here, the carrier 1 has a capacity of $b1$, an optical frequency usage efficiency of $\eta 1$, and a lowest received signal quality of Q, for example. The carrier 2 has a capacity of $b2$, an optical frequency usage efficiency of $\eta 2$, and a lowest received signal quality of Q.

A case will be described where between two carriers that the optical transmitter and receiver (TPND) can generate, only one carrier is in use, and the other carrier is not in use at a certain time. That is to say, a case will be described where an utilization rate of the optical transmitter and receiver (TPND) is equal to $b1/(b1+b2) \times 100$ [%]. When both of the carriers are in use, the utilization rate becomes equal to 100 [%].

If a new traffic demand arises in this situation, the optical network management device additionally designs an optical path 1 capable of accommodating the new traffic demand. If the specifications required for the optical path 1 include the capacity of $b2$, the optical frequency usage efficiency of $\eta 2$, and the lowest received signal quality of Q, the optical path 1 can be created using the above-mentioned unused carrier 2 of the optical transmitter and receiver (TPND).

It is assumed that the optical node device notifies in advance the optical network management device that it is possible to generate an optical signal whose specifications include the capacity of $b2$, the optical frequency usage efficiency of $\eta 2$, and the lowest received signal quality of Q, before the optical network management device additionally designs the optical path 1. That is to say, it can be configured that the optical transmitter and receiver included in the optical node device is capable of transmitting and receiving a plurality of optical carrier waves, and the optical node device information includes information by which it is indicated that there is an unused optical carrier wave in a plurality of optical carrier waves.

In this case, the optical network management device generates the optical path 1 by using the above-mentioned optical transmitter and receiver (TPND) in which there is an opening in the carrier 2, instead of generating the optical path 1 by using another optical transmitter and receiver (TPND) whose utilization rate is equal to 0%. That is to say, the optical network management device sets a desired optical path using the above-mentioned unused optical carrier wave (optical carrier).

This makes it unnecessary to add and use a new optical transmitter and receiver (TPND) even where the optical path 1 is additionally generated.

As described above, in the optical network system of the present example embodiment, optical path design information of which the optical network management device notifies the optical node device does not include optical node device information on the configuration of the optical node device. Therefore, the optical network management device can manage and control the optical node device using the same control parameters no matter what configuration the optical node device has. As a result, according to the optical network system, the optical node device, and the optical path setting method of the present example embodiment, it is possible to reduce the management burden of an optical network management device and simplify its control.

The present invention has been described by taking the example embodiments described above as model examples. However, the present invention is not limited to the above-mentioned example embodiments. The present invention can be implemented in various modes that are apparent to those skilled in the art within the scope of the present invention.

This application is based upon and claims the benefit of priority from Japanese Patent Application No. 2014-234617, filed on Nov. 19, 2014, the disclosure of which is incorporated herein in its entirety by reference.

REFERENCE SIGNS LIST

100 Optical network management device
200 Optical node device
210 Interface unit
220 Optical transmitter and receiver
230 Device information storage unit
240 Control unit
1000 Optical network system

The invention claimed is:
1. An optical network system, comprising:
an optical network management device configured to receive a traffic demand, design an optical path configured to accommodate the traffic demand, and create optical path design information of a design result; and an optical node device configured to be used for creating the optical path, wherein
the optical node device calculates an allocable bandwidth from the optical path design information and optical node device information on a configuration of the optical node device, and the allocable bandwidth is an optical frequency bandwidth of a generable optical path that the optical node device is configured to generate, and
the optical network management device sets, from among optical path candidates having the allocable bandwidth, a desired optical path that matches the optical path design information.

2. The optical network system according to claim 1,
wherein the optical node device selects first optical node device information that defines a first use configuration of the optical node device from among the optical node device information, calculates a first allocable bandwidth of the allocable bandwidth from the first optical node device information and the optical path design information, and determines whether or not a first optical path candidate having the first allocable bandwidth matches the optical path design information.

3. The optical network system according to claim 2,
wherein the optical node device notifies the optical network management device of the first allocable bandwidth if the first optical path candidate matches the optical path design information, and
the optical network management device sets the first optical path candidate as the desired optical path.

4. The optical network system according to claim 2,
wherein the optical node device, if the first optical path candidate does not match the optical path design information, changes the first use configuration of the optical node device into a second use configuration, calculates a second allocable bandwidth of the allocable bandwidth from the optical path design information and second optical node device information that defines the second use configuration, and notifies the optical network management device of the second allocable bandwidth, and
the optical network management device sets a second optical path candidate having the second allocable bandwidth as the desired optical path.

5. The optical network system according to claim 1,
wherein the optical node device selects first optical node device information that defines a first use configuration of the optical node device from among the optical node device information, calculates a first allocable bandwidth of the allocable bandwidth from the first optical node device information and the optical path design information, and notifies the optical network management device of the first allocable bandwidth, and
the optical network management device determines whether or not a first optical path candidate having the first allocable bandwidth matches the optical path design information.

6. The optical network system according to claim 5,
wherein the optical network management device sets the first optical path candidate as the desired optical path if the first optical path candidate matches the optical path design information.

7. The optical network system according to claim 5,
wherein the optical network management device instructs the optical node device to change the first use configuration if the first optical path candidate does not match the optical path design information,
the optical node device changes the first use configuration into a second use configuration, calculates a second allocable bandwidth of the allocable bandwidth from the optical path design information and second optical node device information that defines the second use configuration, and notifies the optical network management device of the second allocable bandwidth, and
the optical network management device sets a second optical path candidate having the second allocable bandwidth as the desired optical path.

8. The optical network system according to claim 1,
wherein the optical node device includes an optical transmitter and receiver configured to transmit and receive an optical signal, a device information storage unit configured to store the optical node device information, and a control unit configured to calculate the allocable bandwidth,
the optical path design information includes a signal capacity and a signal quality,
the optical node device information includes a number of the optical transmitter and receiver, a number of optical carrier waves that the optical transmitter and receiver are configured to transmit and receive, and an optical modulation method that the optical transmitter and receiver uses,
the device information storage unit stores the optical modulation method and an optical frequency usage efficiency of an optical signal to be generated by the optical transmitter and receiver, making a correlation between the optical modulation method and the optical frequency usage efficiency, and
the control unit calculates a bandwidth per the optical transmitter and receiver that is a sum of a unit bandwidth from one to the number of the optical carrier waves, where the unit bandwidth is a quotient that is obtained by dividing the signal capacity by the optical frequency usage efficiency and is calculated for each of the optical carrier waves, and calculates the allocable bandwidth by getting a sum of a bandwidth per the optical transmitter and receiver from one to the number of the optical transmitter and receiver.

9. An optical node device, comprising:
an interface unit configured to receive, from an optical network management device, optical path design information of a design result of an optical path configured to accommodate a desired traffic demand;
an optical transmitter and receiver configured to transmit and receive an optical signal;
a device information storage unit configured to store optical node device information on a configuration of the optical transmitter and receiver; and
a control unit configured to calculate, from the optical path design information and the optical node device information, an allocable bandwidth that is an optical frequency bandwidth of a generable optical path that the optical transmitter and receiver are configured to generate, and determines whether or not an optical path candidate having the allocable bandwidth matches the optical path design information.

10. The optical node device according to claim 9,
wherein the control unit selects first optical node device information that defines a first use configuration of the optical transmitter and receiver from among the optical node device information, calculates a first allocable bandwidth of the allocable bandwidth from the first optical node device information and the optical path design information, and determines whether or not a first optical path candidate having the first allocable bandwidth matches the optical path design information.

11. The optical node device according to claim 10, wherein the control unit notifies the optical network management device of the first allocable bandwidth if the first optical path candidate matches the optical path design information.

12. The optical node device according to claim 10, wherein the control unit, if the first optical path candidate does not match the optical path design information, changes the first use configuration of the optical transmitter and receiver into a second use configuration, calculates a second allocable bandwidth of the allocable bandwidth from the optical path design information and second optical node device information that defines the second use configuration, and notifies the optical network management device of the second allocable bandwidth.

13. The optical node device according to claim 12, wherein the first use configuration differs from the second use configuration in a number of the optical transmitter and receiver.

14. The optical node device according to claim 9, wherein the optical path design information includes a signal capacity and a signal quality, the optical node device information includes a number of the optical transmitter and receiver, a number of optical carrier waves that the optical transmitter and receiver are configured to transmit and receive, and an optical modulation method that the optical transmitter and receiver uses, the device information storage unit stores the optical modulation method and an optical frequency usage efficiency of an optical signal to be generated by the optical transmitter and receiver, making a correlation between the optical modulation method and the optical frequency usage efficiency, and the control unit calculates a bandwidth per the optical transmitter and receiver that is a sum of a unit bandwidth from one to the number of the optical carrier waves, where the unit bandwidth is a quotient that is obtained by dividing the signal capacity by the optical frequency usage efficiency and is calculated for each of the optical carrier waves, and calculates the allocable bandwidth by getting a sum of a bandwidth per the optical transmitter and receiver from one to the number of the optical transmitters and receivers.

* * * * *